US006080312A

United States Patent [19]

Bowers et al.

[11] Patent Number: 6,080,312

[45] Date of Patent: Jun. 27, 2000

[54] DOWNHOLE CYCLONIC SEPARATOR ASSEMBLY

[75] Inventors: Bill E. Bowers, The Woodlands; John Gunnar Hole, Houston, both of Tex.

[73] Assignee: Baker Hughes Limited, London, United Kingdom

[21] Appl. No.: 08/613,929

[22] Filed: Mar. 11, 1996

[51] Int. Cl.[7] .......... B01D 17/038

[52] U.S. Cl. .......... 210/512.2; 210/512.1; 210/170; 210/416.5; 166/265

[58] Field of Search .......... 166/265; 210/512.1, 210/512.2, 170, 416.1, 416.5

[56] References Cited

U.S. PATENT DOCUMENTS

| | | | |
|---|---|---|---|
| 2,311,963 | 7/1943 | Pyle . | |
| 2,726,606 | 12/1955 | Davidson . | |
| 2,910,002 | 10/1959 | Morgan . | |
| 2,953,204 | 9/1960 | Doscher et al. | 166/9 |
| 3,137,344 | 6/1964 | Wiemer | 166/9 |
| 3,167,019 | 1/1965 | Harris . | |
| 3,195,468 | 7/1965 | Bood . | |
| 3,705,626 | 12/1972 | Glenn, Jr. et al. | 166/267 |
| 3,707,157 | 12/1972 | Tipton et al. | 137/14 |
| 3,747,306 | 7/1973 | Wikdahl . | |
| 3,951,457 | 4/1976 | Redford | 299/5 |
| 3,978,926 | 9/1976 | Allen | 166/267 |
| 4,148,735 | 4/1979 | Laval, Jr. . | |
| 4,148,795 | 4/1979 | Laval, Jr. . | |
| 4,237,006 | 12/1980 | Colman et al. . | |
| 4,241,787 | 12/1980 | Price . | |
| 4,296,810 | 10/1981 | Price . | |
| 4,354,553 | 10/1982 | Hensley | 166/244 |
| 4,475,603 | 10/1984 | Hayatdavoudi . | |
| 4,488,607 | 12/1984 | Hayatdavoudi et al. . | |
| 4,544,486 | 10/1985 | Carroll . | |
| 4,573,540 | 3/1986 | Dellinger et al. | 175/61 |
| 4,617,031 | 10/1986 | Suh et al. . | |

(List continued on next page.)

FOREIGN PATENT DOCUMENTS

| | | |
|---|---|---|
| 571174 | 10/1983 | Australia . |
| 924896 | 12/1992 | Norway . |
| 2154910A | 2/1985 | United Kingdom . |
| 2194 575 | 9/1987 | United Kingdom . |
| 2194572 | 3/1988 | United Kingdom . |
| 2194575 | 3/1988 | United Kingdom . |
| 2248198 | 4/1992 | United Kingdom . |
| WO9413930 | 6/1994 | WIPO . |
| WO9528230 | 10/1995 | WIPO . |
| WO 96/30625 | 10/1996 | WIPO . |

OTHER PUBLICATIONS

Kjos. T., et al.: "Subsea and DownHole Separation Systems—The latest advances"; IBC Tech. Serv. Worldwide Deep Water Tech. Conference Feb. 26, 1996; pp. 1–4.

(List continued on next page.)

*Primary Examiner*—David A. Reifsnyder
*Attorney, Agent, or Firm*—Carl Rowold; Patterson & Associates

[57] ABSTRACT

Downhole apparatus for separation of oil from oily water or water from oil having an internal chamber continuously flooded with production fluids from a well, one or more hydrocyclonic separators for separating the production fluid into a stream enriched in oil and an stream depleted in oil. The clearance required between the apparatus and the well casing being the minimum required for running the apparatus into the casing, maximizing the size of the separator(s) and improving capacity. A range of artificial lift devices is included to bring the oil enriched stream to the surface if the natural pressure of the reservoir is insufficient. Substantial axial overlap of multiple separators is provided for better compactness and capacity of the apparatus. Pipes from separator overflow outlets connect to a common overflow manifold, and pipes from the separator underflow outlets connect to a common underflow manifold. Where the space available for pipes and manifolds is limited adjacent to the separators the manifolds may be formed with a non-circular cross section having substantially the same cross-sectional area as adjacent portions of the manifold.

43 Claims, 5 Drawing Sheets

U.S. PATENT DOCUMENTS

| | | | |
|---|---|---|---|
| 4,688,650 | 8/1987 | Hayatdavoudi et al. . | |
| 4,711,720 | 12/1987 | Young | 210/512.2 |
| 4,738,779 | 4/1988 | Carroll et al. . | |
| 4,764,287 | 8/1988 | Colman et al. . | |
| 4,766,957 | 8/1988 | McIntyre . | |
| 4,787,452 | 11/1988 | Jennings, Jr. | 166/272 |
| 4,793,408 | 12/1988 | Miffre . | |
| 4,805,697 | 2/1989 | Fouillout et al. . | |
| 4,822,551 | 4/1989 | Prendergast . | |
| 4,824,562 | 4/1989 | Carson . | |
| 4,836,935 | 6/1989 | Lilienthal . | |
| 4,844,817 | 7/1989 | Flanigan et al. . | |
| 4,889,475 | 12/1989 | Gannaway et al. . | |
| 4,900,433 | 2/1990 | Dean et al. . | |
| 4,900,445 | 2/1990 | Flanigan et al. . | |
| 4,911,850 | 3/1990 | Kalnins . | |
| 4,927,536 | 5/1990 | Worrell et al. . | |
| 4,933,094 | 6/1990 | Kalnins . | |
| 4,964,994 | 10/1990 | Wakley et al. . | |
| 4,976,872 | 12/1990 | Grey . | |
| 4,980,064 | 12/1990 | Carroll . | |
| 4,983,283 | 1/1991 | Grey . | |
| 4,995,989 | 2/1991 | Carroll et al. . | |
| 5,009,784 | 4/1991 | Clarke et al. . | |
| 5,009,785 | 4/1991 | Webb . | |
| 5,017,288 | 5/1991 | Thew et al. . | |
| 5,021,165 | 6/1991 | Kalnins . | |
| 5,032,275 | 7/1991 | Thew . | |
| 5,045,218 | 9/1991 | Prendergast et al. . | |
| 5,049,277 | 9/1991 | Kalnins . | |
| 5,071,556 | 12/1991 | Kalnins et al. . | |
| 5,071,557 | 12/1991 | Schubert et al. . | |
| 5,093,006 | 3/1992 | Kalnins . | |
| 5,117,908 | 6/1992 | Hofmann . | |
| 5,154,826 | 10/1992 | Prendergast et al. . | |
| 5,181,837 | 1/1993 | Niemiec . | |
| 5,296,153 | 3/1994 | Peachey . | |
| 5,320,500 | 6/1994 | Cholet | 417/375 |
| 5,335,732 | 8/1994 | McIntyre . | |
| 5,377,756 | 1/1995 | Northrop et al. | 166/267 |
| 5,456,837 | 10/1995 | Peachey . | |
| 5,497,832 | 3/1996 | Stuebiner et al. . | |
| 5,503,226 | 4/1996 | Wadleigh . | |
| 5,730,871 | 3/1998 | Kennedy et al. . | |

OTHER PUBLICATIONS

PCT International Application Published Under the Patent Cooperation Treaty (PCT); WO 89/11339, Nov. 1989.

Pete Schrenkel, Robert Cox, and Steve Kennedy, "Joint Industry Development of the Downhole Oil Water Separation System," 4 pages, undated.

B.E. Bowers and D.D. Lloyd, C. Matthews, and P. Schrenkel, "Downhole Application of Liquid Liquid Hydrocyclones," 11 pages, undated.

B. R. Peachey, C.M. Matthews, "Downhole Oil/Water Separator Development," 13 pages, undated.

B.R. Peachy, C.M. Matthews, "Downhole Oil/Water Separator Development," Sep. 1994, vol. 33, No. 7, 17–21 pages.

Press Release—Apr. 1995, "Downhole Oil/Water Separation technology Now Proven,"Nov. 1995, 4 pages.

Baker, A.C., Lucal–Clements,D.C. "Application of Subsea Separation and Pumping to Marginal and Deepwater Field Developments" $65^{th}$ Annual Technical Conference of the Society of Petroleum Engineers New Orleans, La, Sep. 1990.

Jones, P.S. "A Field Comparison of Static and Dynamic Hydrocyclones" $65^{th}$ Annual Technical Conference of the Society of Petroleum Engineers New Orleans, La, Sep. 1990.

Choi, M.S. "Hydrocyclone Produced Water Treatment for Offshore Developments" $65^{th}$ Annual Technical Conference of the Society of Petroleum Engineers, New Orleans, La., Sep., 1990.

Young, G.A., Wakeley, W.D., Taggert, D.L. Andrews, S.L., and Worrell, J.R. "Oil–Water Separation using Hydrocyclones—An Experimental Search for Optimum Dimensions" Republication of American Filtration Society Paper Given at Baton Rouge Conference Oct. 29, 1990.

Modular Production Equipment Inc. Modular Protection for the Environment, Product Brochure May 1991.

Baker, A.C. and Entress, J.H. "The VASPS Subsea Separation and Pumping System", Transactions of the Institution of Chemical Engineers, vol. 70, Part A., Jan. 1992.

Fitzgerald, A. "New Twists Developed for Produced Water Systems" Offshore Magazine, Jan. 1992, pp. 43–44.

Wojtanowicz, A.K., Xu, H. "A New Method to minimize Oilwell Production Watercut using a Downhole Water Loop" 1992 Annual Technical Conference of the Petroleum Society of CIM, Jun., 1992, Calgary.

Flanigan, D.A., Stolhand, J.E., and Shimda, E. "Use of Low–Shear Pumps and Hydrocyclones for Improved Performance in the Cleanup of Low–Pressure Water" SPE production Engineering, Aug. 1992.

CFER to Conoco, Invitation to Participate–DownholeOil/ Wate Separator Development Project, Jan. 22, 1992.

New water–injectionmethod works in trial, *Ocean Industry,* Apr./May 1992.

Downhole Separation Development Project (proposed) between Conoco and CFER, Jul. 28, 1993.

Peachey, B.R., Matthews, C.M., Downhole Oil/Water Separator Development, Petroleum Society of CIM, 1993.

Downhole separation issues between Vortoil and CFER, Sep. 30, 1994.

Vortoil to CFER, Downhole separator mockup, Oct. 18, 1994.

Vortoil to CFER, public display of downhole separator mockup, Oct. 24, 1994.

Press Release: Downhole Oil/Water Separation has been Achieved, Jan. 1995.

Reda to Bowers, separators not commercially sold, Feb. 23, 1995.

Canmet article, Hydrocyclones:New alternative for oil water separation; Oil Patch magazine, vol. 14, No. 1, CFER transmittal to Vortoil dated Mar. 6, 1995.

Canmet article, Hydrocyclones:New alternative for oil water separation; Oil Patch magazine, vol. 14, No. 1, CFER transmittal to Vortoil dated Mar. 14, 1995.

Vortoil to Peachey message regarding Prototype Separator Cost and Delivery, Mar. 9, 1995.

Vortoil to Peachey message regarding Additional Prototypes, Multiple Orders, Mar. 14, 1995.

PanCanadian letter to Vortoil regarding Downhole G–Liner Vortoil Separator Systems.

Vortoil message to Russel regarding two stage assemblies, Mar. 22, 1995.

Vortoil message to Peachey regarding issues of delivery dates and contacts, Jun. 5, 1995.

Downhole separator uses hydrocyclone, zone discharge, Drilling and Production, Offshore, Jun. 1995.

Vortoil message to Fielder regarding pricing for PanCanadian applications, Jun. 21, 1995.
Vortoil message to Solanki regarding delivery of beam pump separator unit, Jun. 30, 1995.
Vortoil message to Roggensack regarding downhole separator deliveries; Jun. 30, 1995.
Reda Services purchase order for three hydrocyclones, Jul. 27, 1995.
Vortoil message to Roggensack regarding Hydrocyclones "96" conference; Downhole Separation Paper; Sep. 14, 1995.
The Conference Team letter to Vortoil regarding Abstract for paper: Downhole Separation with Hydrocyclones, Jul. 29, 1995.
Vortoil message to Fielder regarding price list and payment terms for inventory; Aug. 30, 1995.
Read process technology brochure: Downhole Water–Oil Separation and Reinjection Through Well Branches, Sep. 7, 1995.
Vortoil Brochure, Are Your Profits Being Watered Down? Oct., 1995.
Vortoil product information sheets, 1995.

381
380
321
340
300
305
340A
361B
370
360
340

340A
370
300
360
361B
320
340B
340
303
340A
4E
4E
370
360
304

313
340
302
360A
370
361B
320
330
117
301
4D
4D
300
370
350
311
310
361A

DOWNHOLE CYCLONIC SEPARATOR ASSEMBLY

FIELD OF THE INVENTION

The present invention relates to apparatus and methods for the separation of liquids of differing densities in production streams from underground wells. More particularly, the invention relates to the downhole hydrocyclonic separation of a oil well or groundwater cleanup well production stream into two streams, a first stream enriched in oil relative to the production stream, and a second stream depleted in oil relative to the production stream, and transportation of the first, oil-enriched, stream to the surface.

BACKGROUND OF THE INVENTION

Hydrocyclones are compact, centrifugal separators with no moving parts, which separate liquids in a liquid mixture. Hydrocyclones are widely used in both onshore and offshore oil production in above-ground applications such as bulk water knockout from produced fluids, de-oiling produced water prior to either water reinjection into a formation or water disposal to a disposal site. In these applications a plurality of hydrocyclones are typically mounted within a pressure vessel assembly. Such an assembly resembles a shell-and-tube heat exchanger, in that the hydrocyclones are mounted to tube sheets which are sandwiched between flanges in the pressure vessel. The complete pressure vessel assembly typically has a single inlet for the produced liquid stream, which comprises as for example, a mixture of oil and water and a plurality of outlets for the separated liquid streams. The assembly has an outlet for the "clean water" stream, which is relatively depleted in oil as compared to the production liquids, and an outlet for the "dry oil" stream, which is relatively enriched in oil as compared to the produced liquids.

Hydrocyclones, as they are employed in oil production and environmental cleanup applications are designed foremost to remove oil from water, that is, to produce a clean water stream with as low a concentration of oil as practicable. The dry oil stream will typically contain about 50 percent water, by volume, and may contain more than 50 percent water. Hydrocyclones, in a single-stage configuration, cannot produce both a completely water-free oil stream and a completely oil-free water stream; the design performance must be biased towards either the "dry oil" stream or the "clean water" stream. A clean water stream is obtained at the expense of "wet oil". Conversely, a dry oil stream is obtained at the expense of oily water. Hydrocyclone designs that are exemplary of those in the art are described in British Patent Application GB-A-2248198, and U.S. Pat. No. 4,237,006, which is incorporated herein by reference for all purposes. Multi-stage separator assemblies including multiple hydrocyclones arranged in series, such as taught by U.S. Pat. No. 4,738,779, incorporated herein by reference for all purposes, can achieve improved separation at the expense of increasing the pressure drop of the liquids moving through the multi-stage assembly.

Hydrocyclones are also useful for making a preliminary separation of oil from water in the production liquids produced downhole in an oil well prior to the production liquids being transported to the surface. This is of particular value in high water cut wells, with a high water content, where the production liquids may comprise about 70 percent, or more, water. Conventionally, this water must be transported above ground, at significant cost and then disposed of, at additional expense. Hydrocyclone assemblies designed for above-ground use however, are not suitable for downhole applications where the assembly must be disposed within the bore hole of an oil well. This is because conventional hydrocyclone assemblies of sufficient capacity exceed the size limitations imposed by the diameter of the well. Further, previous attempts to overcome these problems have resulted in additional complications.

For example, PCT International Application WO 94/13930 discloses a downhole separation apparatus in which one or more hydrocyclones are contained within an axially elongate tubular housing, with the inlet of each hydrocyclone extending through the wall of the housing and having an opening external of the housing. The separated dry oil and clean water streams from each hydrocyclone are transported from the housing by a relatively complex system of pipes. With this apparatus there must be sufficient clearance between the housing and the adjacent wall of the well casing to provide a flow annulus for transporting the production fluid to the hydrocyclone inlets. This limits the diameter of the hydrocyclone housing for a given size casing, and hence reduces the capacity of the separation apparatus. Further, the internal space within the housing, but outside of the separators and piping, is dry, so that there is a very substantial pressure differential across the walls both of the housing and the piping within the housing. Further, the housing must be tightly sealed against the full well bore pressure. This obviously requires the use of heavy gauge and/or specialty materials for construction of the housing, which results in increased costs for both materials and fabrication, and increases the risk of failure of the assembly.

In applications where the pressure of the liquids in the well bore is too low, pumps and associated pump driving equipment, are required. WO 94/13930 for example, discloses placing a pump on the clean water stream to assist in reinjection of the clean water into the formation. This does not address the important problem of transporting the dry oil stream to the surface however. U.S. Pat. No. 5,296,153 discloses pumping the dry oil stream to the surface and the clean water stream to another formation. This further increases the cost and complexity of oil production, exacerbates the problem of locating the equipment within the well bore, and requires pumping the clean water stream, which increases both the capital and operating costs of oil recovery.

The present invention overcomes the deficiencies of the prior art.

SUMMARY OF THE INVENTION

According to the present invention, there is provided a downhole separation assembly comprising an axially elongate tubular housing defining an internal chamber, and having at least one inlet which is arranged to allow production fluid to flood the chamber. At least one hydrocyclone separator is contained in the chamber and has an inlet open to the chamber so that the production fluid in the chamber enters each separator. An overflow outlet and an underflow outlet are provided for each separator, and are connected to pipes which lead out of the chamber.

By flooding the chamber containing the separator(s) in this way, it is unnecessary to provide a flow annulus between the housing and the well casing to supply production fluids to the separator inlet(s), so that the radial clearance between the walls of the housing and the well casing can be reduced to only that which is necessary to run the housing into the casing. To further reduce costs and further increase capacity, the well casing may be used as the housing, in which case the chamber is defined by the well casing and a pair of axially spaced packers which are well known in the art. The present invention thus allows the diameter of the tubular housing to increased to nearly the diameter of the casing, thereby maximizing the capacity of the separation apparatus. Further, as there is a substantially reduce, and possibly no, pressure differential across the housing wall it is unnecessary to provide the heavy gauge or specialty materials of the prior art to achieve the same structural integrity of the housing, and heavy duty seals are no longer required.

If the pressure in the well bore is low enough that the pumping of the production fluid is required prior to separation, the separation apparatus preferably includes a pumping unit which pumps production liquids into the chamber. A second pumping unit may also be provided, if necessary, to transport the dry oil stream to the surface. If, on the other hand, the pressure in the well bore is sufficiently high that no upstream pumping is required, the housing can be provided with a plurality of apertures so that the production fluid enters the housing at a plurality of locations along the length of the tubular housing. In this case, the size of the apertures may be smaller than the size of any of the passages within the housing and separator(s), to avoid a flow blockage of the separator(s) by any solid matter in the production fluid.

Preferably, a plurality of axially spaced separators are disposed in the chamber. In order to provide increased capacity, it may be desirable, in some cases, for adjacent separators to face in opposite directions, with some axial overlap between portions of adjacent separators. Where adjacent hydrocyclone separators do not face in opposite directions, substantial axial overlap may also be provided to maximize the compactness and hence the capacity of the separator assembly.

In order to reduce the complexity of the piping and seals required, it is desirable for the pipes leading from the overflow outlets of the separators to be connected to a common overflow outlet manifold within the chamber, and for the pipes which lead from the underflow outlets of the separators to be connected to a common underflow outlet manifold within the chamber.

For most applications, the overflow stream will leave the chamber at one end of the housing for transportation of a dry oil stream to the surface, while the underflow stream will leave the chamber at the opposite end of the housing for transportation of a clean water stream for disposal downhole or elsewhere. If all of the overflow outlet pipes discharge through one end of the housing and/or all of the underflow outlet pipes discharge through the opposite end, it will be necessary for a pipe or manifold leading from the overflow outlet of a separator to extend longitudinally past the separator or separators positioned above it in the chamber, and/or for a pipe or manifold leading from the underflow outlet of a separator to extend longitudinally past the separator or separators positioned below it in the chamber. In this case, the space available for a pipe adjacent to the head of each hydrocyclone separator may be limited, because the head by its nature is the widest part of a hydrocyclone separator. At such locations, the pipe may be formed with a non-circular cross section having substantially the same cross-sectional area as do the adjacent portions of the pipe. For example, the non-circular cross section may be substantially kidney-shaped.

Examples of the more important features of the invention have been summarized broadly in order that the detailed description thereof that follows may be better understood, and in order that the contributions to the art may be better appreciated. There are, of course, additional features of the invention that will be described hereinafter and which will form the subject of the appended claims. These and various other characteristics and advantages of the present invention will be readily apparent to those skilled in the art upon reading the following detailed description of the preferred embodiments of the invention and by referring to the accompanying drawings.

Other objects and advantages of the invention will appear from the following description.

BRIEF DESCRIPTION OF THE DRAWINGS

For a detailed description of a preferred embodiment of the invention, reference will now be made to the accompanying drawings, wherein.

DESCRIPTION OF THE PREFERRED EMBODIMENTS

For purposes of illustration and not by way of limitation, the present invention is described with respect to several exemplary down hole hydrocyclone separator assemblies for separating the produced liquids from a well into a dry oil stream and a clean water stream, with satisfactory capacity, compactness, and cost, for application to conventional high cut oil wells in oil production or environmental cleanup.

Figure 1A:
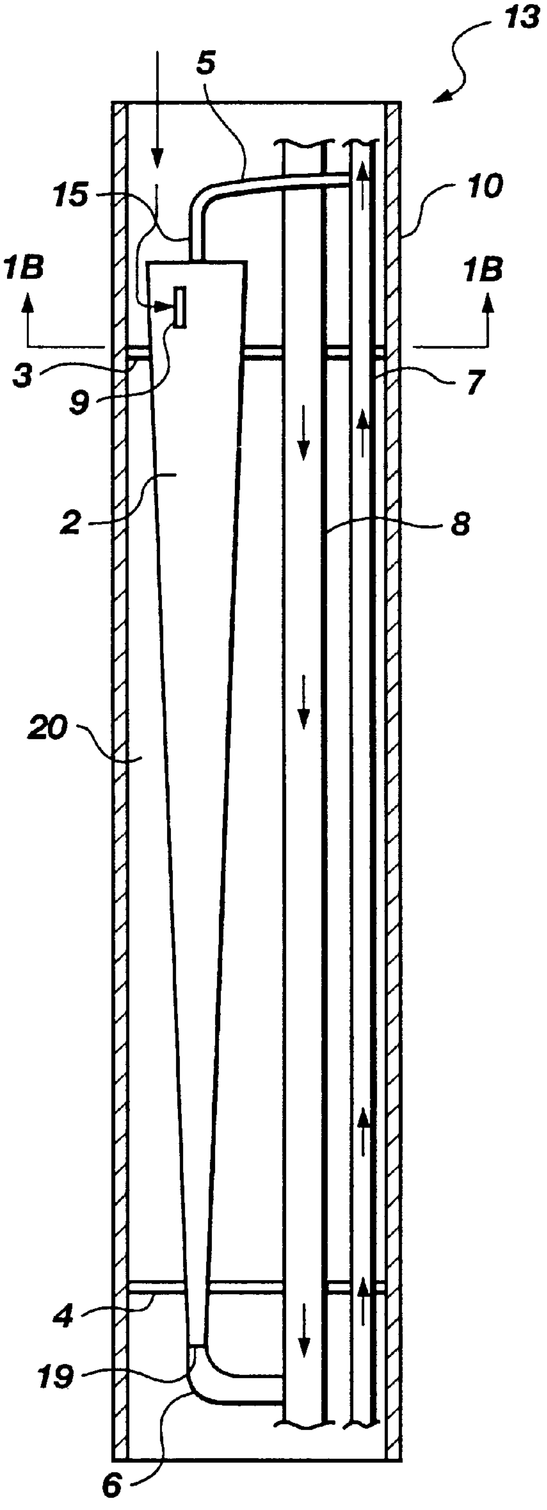
FIG. 1A is a schematic which depicts a down hole hydrocyclone separator assembly in accordance with the present invention shown in a simplified axial cross-section as having a single hydrocyclone.
Figure 1B:
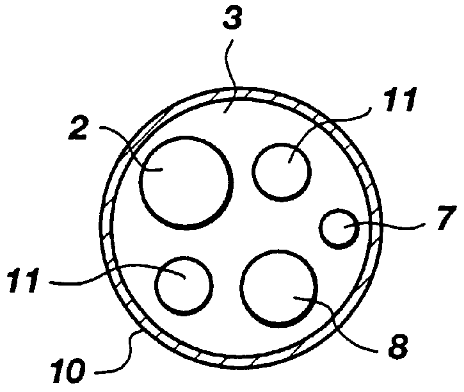
FIG. 1B is a schematic illustration of the embodiment of the invention depicted in FIG. 1A, in radial cross-section taken through section 1B—1B.

Referring now to FIGS. 1A and 1B, there is shown a simplified schematic diagram of a first preferred embodiment of the hydrocyclone separator assembly of the present invention comprising a single hydrocyclone. The separator assembly, denoted generally by reference numeral 13, preferably comprises a housing 10, a hydrocyclone 2, and an internal chamber 20 defined by the inside diameter of housing 10. Optionally, upper and lower support plates 3 and 4, respectively, may be provided for supporting the piping and hydrocyclone 2 within chamber 20. If support plates 3 and 4 are used, production openings 11 are provided in support plates 3 and 4 so that internal chamber 20 remains open to the production liquids. An overflow manifold 7 and an underflow manifold 8 extend through chamber 20 in a longitudinal axis orientation and are preferably provided when multiple separator assemblies are disposed in the well. Manifolds 7 and 8 are both firmly affixed to both support plates 3 and 4.

Hydrocyclone 2 is preferably of a well known de-oiling configuration such as that described in British Patent Application GB-A-2248198, and has one or more tangential inlets 9 which are open to the interior of the housing 10. An underflow pipe 6 is hydraulically connected to the underflow outlet 19 of the hydrocyclone separator 2, and is hydraulically connected to the underflow manifold 8. Similarly, an overflow outlet pipe 5 is connected to the overflow outlet 15 of hydrocyclone separator 2, and is connected to the overflow manifold 7.

In operation, one or more separator assemblies 13 are run into the cased well bore with minimal clearance between the exterior wall of housing 10 and the interior wall of the well casing. Production fluid, which has either been pressurized by a pump or is naturally under pressure, floods the internal chamber 20, and enters hydrocyclone separator 2 through separator inlet(s) 9. If support plates 3 and 4 are provided, production fluid floods chamber 20 by flowing through production openings 11. The production fluid is caused to swirl within hydrocyclone 2 by the tangential orientation of inlet(s) 9. In hydrocyclone separator 2, the production fluid is separated into a clean water stream which flows to the underflow and a dry oil stream which flows to the overflow as is well known in the art. As noted above, the clean water stream is enriched in water relative to the production liquid stream, while the dry oil stream is enriched in oil relative to the production stream. The underflow from the hydrocyclone separator 2 flows through the underflow outlet pipe 6 to underflow manifold 8, and is preferably transported downhole below assembly 13 for disposal or reinjection into the formation. The dry oil from the overflow outlet 15 flows up through the overflow outlet pipe 5 to overflow manifold 7, and then to the surface where it may be further treated. In applications where a single hydrocyclone assembly is disposed within the oil well, underflow pipe 6 is preferably connected to a disposal pipe (not shown) below housing 10, whereby manifolds 7 and 8 are no longer necessary.

Figure 2A:
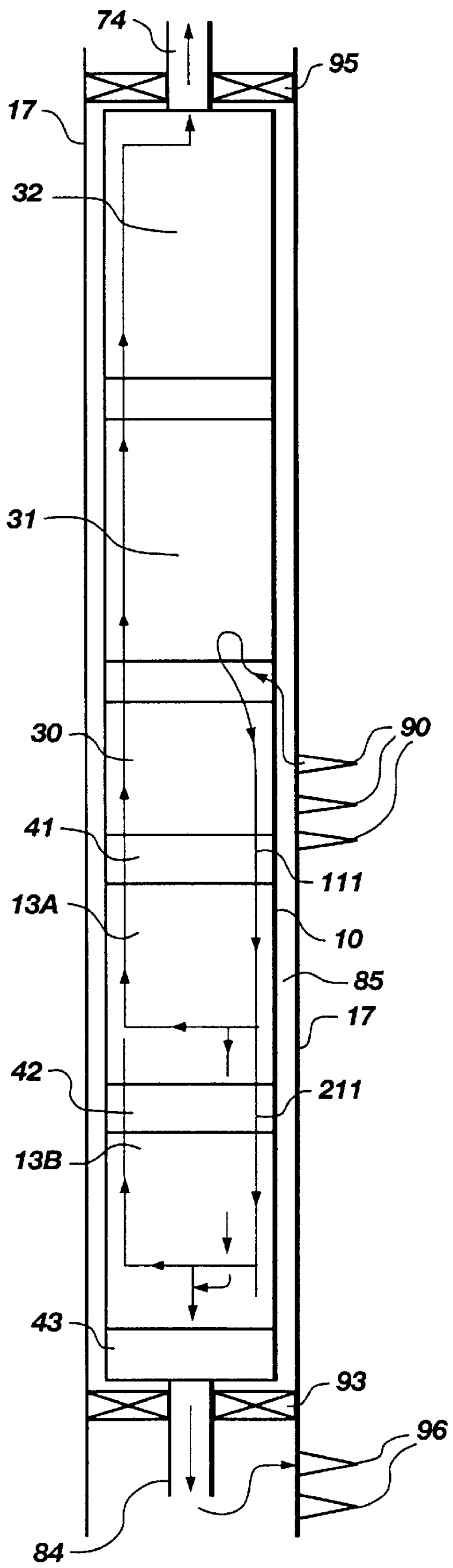
FIG. 2A depicts a schematic representation of an embodiment of the present invention which includes a first pump for the produced liquids stream and a second pump for the dry oil stream and illustrates an exemplary arrangement of the apparatus within a well bore.

Referring now to FIG. 2A, there is shown a schematic representation of a second preferred embodiment of the separator assembly of the present invention including a plurality of the separator assemblies 13 shown in FIG. 1A. Separator assemblies 13 are disposed between two axially spaced packers, a lower packer 93 and an upper packer 95. Upper packer 95 is optional. Upper packer 95 is used when an upper formation is isolated from the formation having perforations 90; when the disposal liquid, such as water, is to be disposed above the separator assembly; or when it is desirable to prevent the production fluids from perforations 90 from flowing up hole. Two such separator assemblies, top separator assembly 13A and bottom separator 13B are shown, although any number of separator assemblies 13 may be used without departing from the scope of the present invention. It should be appreciated that separator assemblies 13A and 13B are substantially the same as separator assembly 13 described with respect to FIG. 1A, and like reference numerals will be used for like parts with the designation A or B for upper and lower assemblies 13A and 13B, respectively.

A production pump 31 is provided for pumping the production fluids and an overflow pump 32 is provided for pumping the overflow (dry oil) stream to the surface. Pumps 31 and 32 are driven by drive means such as one or more drive motors 30. For illustration and not by way of limitation, pumps 31 and 32 may be electric submersible pumps, progressive cavity pumps, or beam (or rod) pumps, all of which are well known in the art. Many other types and combinations of pumps and drive systems may be successfully used in accordance with the present invention, such as jet pumps and gas lift systems. As will be readily apparent to one skilled in the art, a range of artificial lift systems may be used in conjunction with the natural reservoir pressure without departing from the scope of the present invention.

Pumps 31, 32 and drive motor 30 are preferably disposed above separator assemblies 13A, 13B to simplify connection to a power source (not shown) which supplies electric or hydraulic power to drive motor 30. Other arrangements of pumps 31, 32 and drive motor 30 with respect to separator assemblies 13A and 13B are, of course, possible without departing from the scope of the invention.

While the embodiment of the invention described with respect to FIG. 2A illustrates only two separator assemblies 13A and 13B, any number of such assemblies may be used in conjunction with the apparatus described immediately below. Separator assemblies 13 are thus modular, and the number of such modules used should be determined in practice by the desired overall capacity, available reservoir pressure, and choice and design of pumps.

Figure 2B:
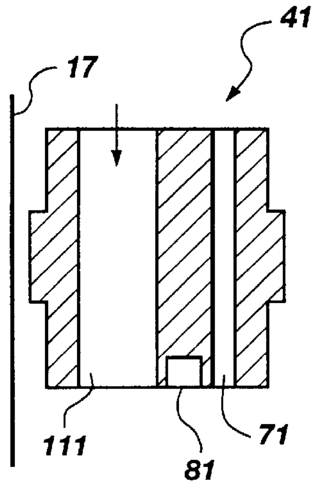
FIG. 2B depicts in axial cross-section a schematic representation of a first sub in accordance with the embodiment of the invention illustrated in FIG. 2A.

Referring now to FIG. 2B, a first or top sub 41 is preferably disposed between drive motor 30 and the separator assembly 13A, as shown in FIG. 2A, and hydraulically seals around its periphery to well casing 17. Sub 41 preferably includes a passage 111 for the production fluids being pumped, an overflow passage 71, and a blind bore 81 for receiving one end of underflow manifold 8A to prevent upward passage of the underflow stream. Passage 111 allows the production fluids from the outlet of production pump 31 to flow to separator assembly 13A. Overflow passage 71 in sub 41 interconnects the overflow manifold 7A (shown in FIG. 1A) of separator assembly 13A to a dry oil conduit means (not shown) extending to the surface through which the dry oil is transported to overflow pump 32. Blind bore 81 of sub 41 hydraulically seals off one end of underflow manifold 8A.

Figure 2C:
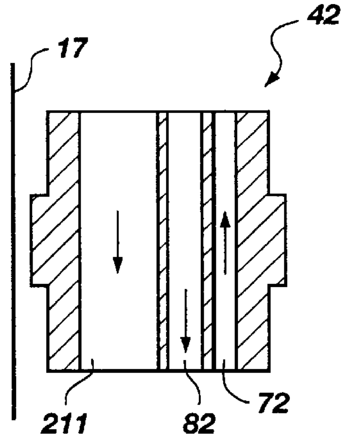
FIG. 2C depicts in axial cross-section a schematic representation of a second sub in accordance with the embodiment of the invention illustrated in FIG. 2A.

Referring now to FIG. 2C, a second or connecting sub 42 preferably is disposed between any two of separator assemblies 13, such as separator assemblies 13A and 13B, as shown in FIG. 2A for connecting adjacent assemblies. Sub 42 preferably includes a passage 211 for the pumped production fluids, an overflow passage 72, and an underflow passage 82. Passage 211 hydraulically interconnects the two separator assemblies 13A and 13B adjacent to sub 42 for the flow of production fluids. Thus the production fluids may pass freely between internal chambers 20A and 20B of separator assemblies 13A and 13B. Overflow passage 72 hydraulically interconnects the overflow manifolds 7A and 7B of any two separator assemblies 13 adjacent to sub 42, such as top separator assembly 13A and bottom separator assembly 13B. Similarly, underflow passage 82 hydraulically interconnects the underflow manifolds 8A and 8B of the two separator assemblies 13 adjacent to sub 42.

Figure 2D:
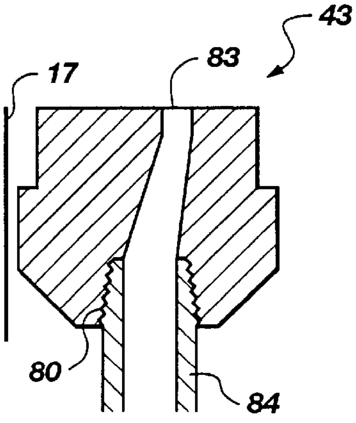
FIG. 2D depicts in axial cross-section a schematic representation of a third sub in accordance with the embodiment of the invention illustrated in FIG. 2A.

Referring now to FIG. 2D, a third or bottom sub 43 preferably is disposed between the bottom separator assembly 13B and lower packer 93. Sub 43 preferably includes underflow passage 83, which terminates at its lowest end in a threaded pipe box 80. Underflow passage 83 hydraulically connects the underflow manifold 8B of the bottom separator assembly 13B to a disposal pipe 84, shown in FIG. 2A.

Referring again to FIG. 2A, in operation, production fluids enter the annulus 85 formed between housing 10 and well casing 17 through production perforations 90 in casing 17. The production fluids are drawn into production pump 31 and pumped through production passage 111 of first sub 41 to top separator assembly 13A. Should optional support plates 3A and 4A be used the production fluids flood chamber 20A by passing through production openings 11A. (See FIG. 1A). The production fluids also pass through production passage 211 in second sub 42 and, as above, flood the internal chamber 20B of bottom separator assembly 13B below sub 42. In this way, the internal chamber 20 of each of the separator assemblies 13 is flooded with production fluids.

As described above with reference to FIG. 1A, the production fluids are separated by the hydrocyclones 2A and 2B, with the overflow streams passing into overflow manifolds 7A and 7B and the underflow streams passing into underflow manifolds 8A and 8B. The overflow manifolds 8A and 8B of the several separator assemblies 13A and 13B form a continuous manifold by virtue of passage 72 through sub 42. The overflow thus flows up through overflow manifolds 7A and 7B, through overflow passage 72 of sub 42, through overflow passage 71 of sub 41, to overflow pump 32, which then pumps the overflow through recovery pipe 74 extending to the surface. In wells with sufficient natural reservoir pressure, overflow pump 32 is not required.

Similarly, the underflow manifolds 7A and 7B of the several separator assemblies 13A and 13B form a continuous manifold by virtue of passage 82 through sub 42. The underflow is prevented, by blind bore 81 in sub 41, from passing up the well. The underflow from all the separator assemblies 13 therefore finally exits via passage 83 in sub 43 and disposal pipe 84, and may then be injected into the formation via injection perforations 96, located in the well casing 17 anywhere below lower packer 93. It should be understood that although the embodiment of the invention described with reference to FIG. 2A includes two separator assemblies 13A and 13B, any number of modular separator assemblies 13 may be used without departing from the scope of the present invention.

Figure 3A:
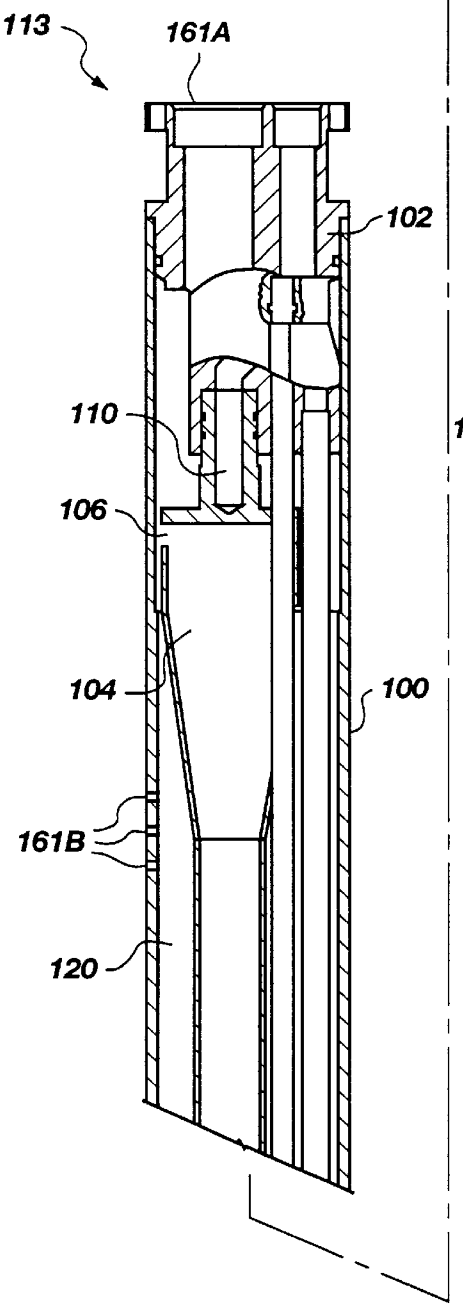
FIGS. 3A and 3B are each broken axial section views of portions of a down hole hydrocyclone separator assembly in accordance with the present invention and illustrate an assembly with two hydrocyclones and associated piping and connections.
Figure 3B:
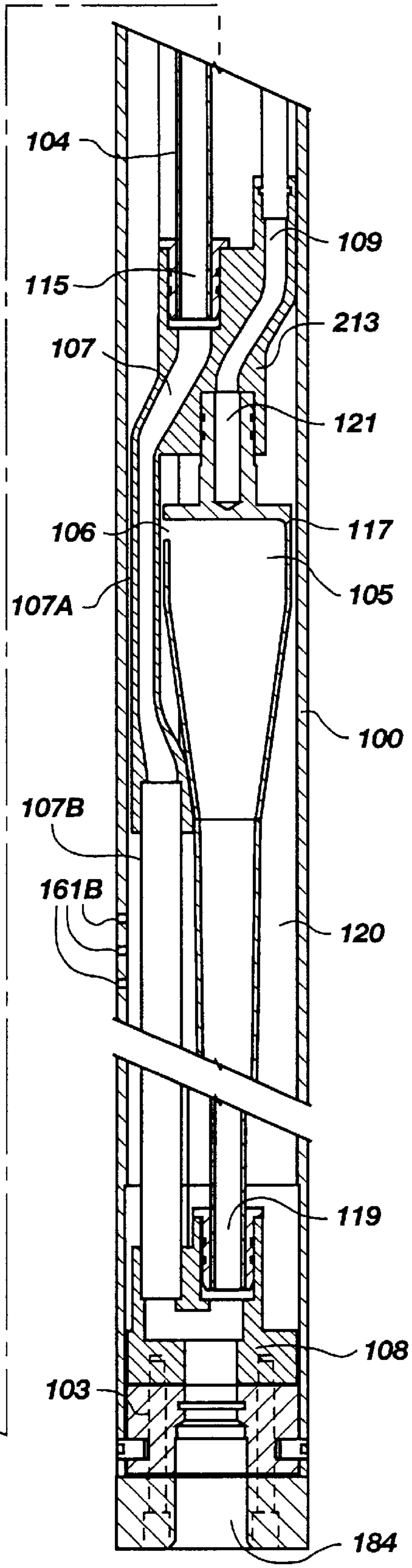

Referring now to FIGS. 3A and 3B, there is shown a third preferred embodiment of the hydrocyclone separator assembly of the present invention, generally denoted by reference numeral 113, which includes two hydrocyclones. The separator assembly 113 comprises a housing 100 defining an internal chamber 120 which is sealed at an upper end by a first sealing block 102 and at a lower end by a second sealing block 103. The separator assembly may be reversible, in which case first sealing block 102 seals the lower end and second sealing block 103 seals the upper end. A production fluid inlet may be provided to separator assembly 113 in either of two ways. First, if a production fluid pump is provided above the first sealing block 102 (such as production pump 31 shown in FIG. 2A) or below the second sealing block 103, an inlet 161A into the chamber 120, such as is shown in first sealing block 102, is preferably provided through the appropriate sealing block. On the other hand, if no pump is required, the housing 100 is preferably provided with a plurality of apertures, such as holes 161B, or slots (not shown) which allow direct access for the production fluid into the chamber 120. As will be apparent to one skilled in the art, alternative types of apertures may be provided without departing from the scope of the present invention.

An upper hydrocyclone separator 104 and a lower hydrocyclone separator 105, preferably are arranged in parallel within housing 100. The hydrocyclone separators 104 and 105 have a de-oiling configuration which is well known in the art. Both separators 104 and 105 have one or more tangential inlets 106 which are open to the interior of separators 104 and 105. Although the inlets are illustrated as being in the plane of the section, this is only for clarity and, in practice, the inlets will generally be out of this plane.

An underflow pipe 107 is connected to the underflow outlet 115 of the upper hydrocyclone separator 104 and leads down the chamber 120 in a longitudinal axis orientation past the lower separator 105. In the region adjacent to the head 117 of the lower separator 105, the first underflow outlet pipe is provided with a non-circular portion 107A which, in plan, may have a substantially kidney-shaped cross section. This cross-sectional configuration ensures that the cross-sectional area of the pip underflow pipe 107 remains substantially unchanged as the non-circular portion 107A of underflow pipe 107 passes the head of lower separator 105, despite the limited space available adjacent to the head 117 of the second separator 105. Of course, where not required by space limitations, non-circular portion 107A is not necessary, so long as the cross-sectional area of underflow pipe 107 is maintained substantially constant. It should also be appreciated that non-circular portion 107A may include a plurality of pipes extending between outlet 115 and the main tubular portion 107B of pipe 107, it being important that the cross-sectional flow area is substantially the same around head 117 as with portion 107A. However, multiple pipes are not preferred because they take up more area within housing 100 than non-circular portion 107A. The underflow outlet pipe 107 leads to a manifold 108 which is shown as a part of the second sealing block 103. The underflow outlet 119 of the lower separator 105 is also connected to manifold 108 so that the underflow streams from the two separators 104, 105 are combined prior to passing through second sealing block 103.

Similarly, an overflow outlet pipe 109 leads from the outlet 121 of lower separator 105 past the upper separator 104, and the overflow stream from lower separator 105 combines with the overflow stream from outlet 110 of the upper separator 104 in a manifold (not shown) similar to manifold 108, which then passes through first sealing block 102.

It should be appreciated that it is most desirable to maximize the size of the head 117 of the separators within housing 100, or casing 17 if no separate housing is utilized for the separator assembly, to maximize the separation capacity of each separator. However, the remaining cross-sectional area around head 117 must accommodate not only underflow manifold 107 and overflow manifold 108 but must also leave adequate flow area for the production fluids flowing by head 117 to feed other separators in the assembly.

The construction of the separator assembly 113 (as well as separator assembly 13, FIG. 1A) is preferably simplified by the use of many standard pipe sections as are well-known in the art, and hydrocyclones of de-oiling configurations, also well known in the art. Generally, the only specialty parts required are the first sealing block 102 and the second sealing block 103, the non-circular pipe section 107A (if necessary), and an adapter 213 provided between the two separators 104, 105 for connecting separator outlets 107, 121 to corresponding pipes.

In operation, running the separator assembly 113 into a well bore preferably requires only minimal clearance between the walls of housing 100 and the well casing, i.e., only enough clearance to run the assembly through the well casing. For example, the diametrical clearance may be as small as one sixteenth of an inch. No clearance is required for the flow of production fluids, as in the prior art, since chamber 20 is open to the flow of production fluids. Production fluids flood the internal chamber 120 through the alternative production fluid inlets described above. The production fluids in the internal chamber 120, which have been either pressurized by a pump or is naturally under pressure, enters the two separators 104, 105 through respective separator tangential inlets 106, and is caused to swirl by the tangential orientation of inlets 106. In the separators 104, 105 the production fluids are separated into a clean water stream which flows to the underflow and a dry oil stream which flows to the overflow. As noted above, the clean water stream is enriched in water relative to the production fluids, while the dry oil stream is enriched in oil relative to the production fluids. In the embodiment illustrated in FIGS. 3A and 3B, the underflow from the two separators flows through the second sealing block 103, and may then be transported downhole for disposal or reinjection via outlet 184. The dry oil stream from the overflow flows up through the first sealing block 102 and then to the surface where it may be further treated.

Although the embodiment described above has only two hydrocyclone separators, further separators can be used if required. In this case, a common underflow outlet pipe is preferably progressively larger in cross-sectional area as it extends down the chamber 120 because the underflow outlet streams from further separators join the common underflow outlet pipe substantially increasing the volume of flow. Similarly, a common overflow outlet pipe is preferably progressively larger in cross-sectional area as it extends up the chamber, because the overflow outlet streams from further separators join the common overflow outlet pipe also increasing the volume of flow.

With respect to the embodiment of the separator assembly described above with reference to FIGS. 3A and 3B, the outside diameter of housing 100 is preferably less than the inside diameter of the well casing by only the clearance necessary to run the assembly 113 into the well. For example, the diametrical clearance may be approximately one-sixteenth of an inch. This maximizes the diameter of the separator assembly and housing, and maximizes the size of separators 104 and 105, thereby maximizing the capacity of the entire separator assembly.

For example, assemblies such as assembly 113 having two hydrocyclones in accordance with the embodiment described above have been constructed and tested where the outside diameter of housing 100 is 4.5 inches and the length of housing 100 is about 13 feet. Such an assembly is suitable for use in 5 inch well casing having an inside diameter of 4$\frac{9}{16}$ inches. A capacity of up to 4,000 barrels of production fluid per day may be achieved with such a two hydrocyclone assembly. The cross-sectional area of the head of each hydrocyclone 104 and 105 may be one-half or greater than the cross-sectional area of the housing 100. It is preferable to maximize this ratio to maximize the capacity of the separator assembly. The remaining cross-sectional area of housing 100 is used for manifolds 107, 108 and the flow of production fluids.

Referring now to FIGS. 4A–4E, there is shown a fourth preferred embodiment of the hydrocyclone separator assembly of the present invention which includes five hydrocyclones, and is denoted generally by reference numeral 313. The separator assembly 313 comprises a tubular housing 300 defining an internal chamber 320 which is sealed at an upper end by a top adapter 310 and at a lower end by a bottom adapter 380. Top adapter 310 and bottom adapter 380 are secured to housing 300 by threaded collars 311 and 321, respectively. Separator assembly 313 may alternatively be reversed, so that adapter 310 is disposed at the lower end and adaptor 380 is disposed at the upper end.

A production fluid inlet may be provided in either of two ways. First, if a production fluid pump is provided above the top adapter 310 (such as production pump 31 shown in FIG. 2A) or below the bottom adapter 380, an inlet 361A into the chamber 320 is provided through the appropriate adapter, such as shown in adapter 310. On the other hand, if no pump is required, the housing 300 may be provided with a plurality of apertures, such as holes 361B, or slots (not shown), or screened openings (not shown), which allow direct access of the production fluids into the chamber 320. As one skilled in the art will immediately understand, other means of providing the plurality of apertures may be employed without departing from the scope of the invention.

The five hydrocyclone separators, denoted in order moving from the top adapter 310 to the bottom adapter 380 by reference numerals 301, 302, 303, 304, and 305, are preferably arranged in parallel within housing 300. Once again, the hydrocyclone separators have a well known de-oiling configuration as is well known in the art. Each of the separators has one or more tangential inlets (not shown, but substantially similar to inlets 106 described above with reference to FIGS. 3A and 3B) which are open to the interior of the separators.

An underflow pipe 360 connects each of the underflow outlets of the hydrocyclone separators 302, 303, and 304, to an underflow manifold 340. For example, an underflow pipe 360A connects the underflow outlet of the top hydrocyclone 301 to underflow manifold 340. Underflow pipe 360A may vary slightly in its cross-sectional configuration from underflow pipes 360 because underflow pipe 360A forms the top inlet of underflow manifold 340. Underflow manifold 340 extends down through the chamber 320 and past the lowest hydrocyclone 305, into bottom adapter 380. The underflow from hydrocyclone 305 also leads to bottom adapter 380, so that the underflow stream from all of the hydrocyclone separators 301–305 is combined prior to passing through bottom adapter 380. The underflow from hydrocyclone 305 communicates with the bore 381 of bottom adapter 380, as does underflow manifold 340.

Figures 4A, 4B, 4C:
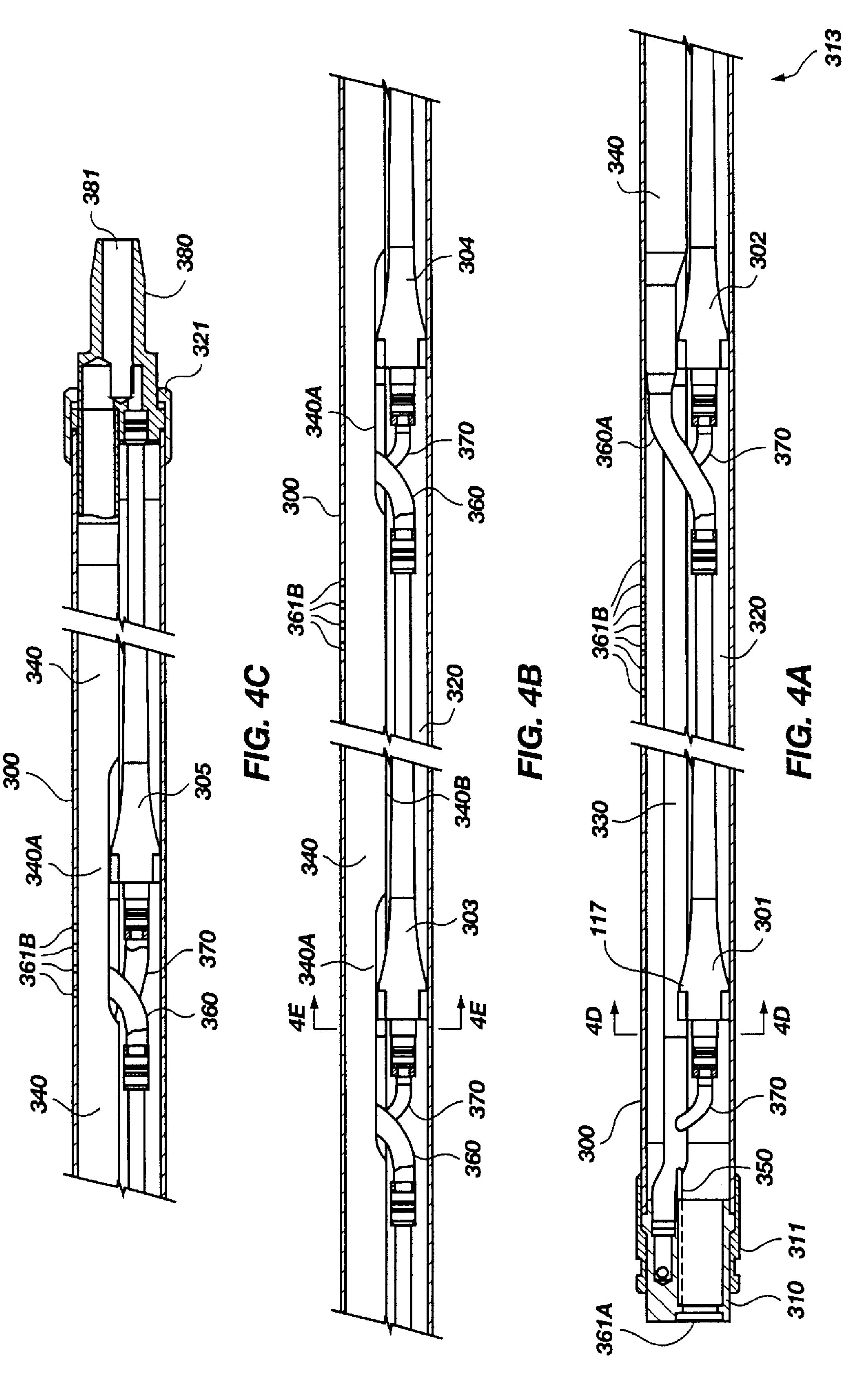
FIGS. 4A, 4B, and 4C are each broken axial section views of portions of a down hole hydrocyclone separator assembly in accordance with the present invention and illustrate an assembly with five hydrocyclones and associated piping and connections.
Figure 4D:
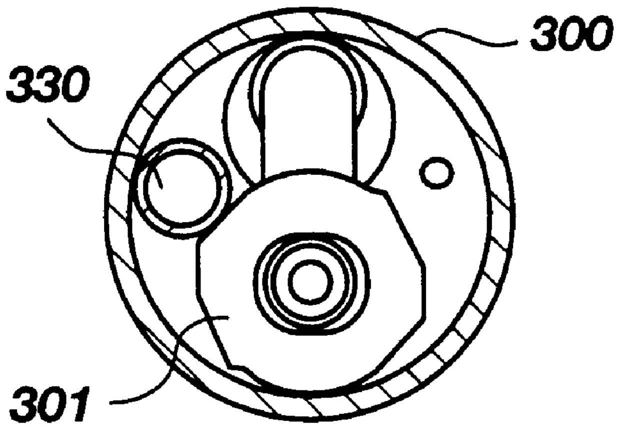
FIG. 4D is a radial cross-section view of the embodiment illustrated in FIG. 4A taken through section A—A.
Figure 4E:
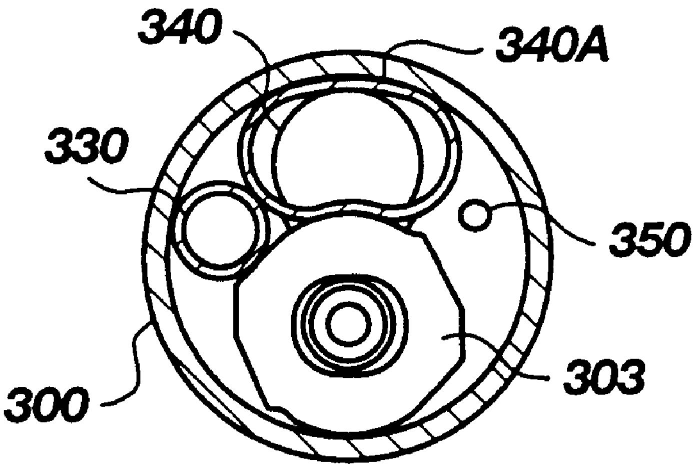
FIG. 4E is a radial cross-section view of the embodiment illustrated in FIG. 4B taken through section B—B.

Referring now to FIGS. 4A, 4B, 4C and 4E, in the region adjacent to the heads 117 of hydrocyclone separators 302, 303, 304, and 305, the underflow manifold 340 may be provided with a non-circular portion 340A which, in plan, may have a substantially kidney-shaped cross section (See FIG. 4E). Although shown as substantially kidney-shaped in cross-section, non-circular portion 340A may have any cross-sectional configuration that ensures that its cross sectional area at the standard circular portion 340B remains substantially unchanged as the non-circular portion 340A of underflow manifold 340 passes the head 117 of separators 302–305, despite the limited space available. It should also be appreciated that the underflow manifold 340 and overflow manifold 330 shown in FIG. 4E adjacent head 117 of a separator may be cast into one piece which includes two flow passages therethrough, one for overflow and another for underflow. A one piece casting further reduces the cross-sectional area required to by-pass head 117 by manifolds 330, 340. If space limitations do not require it, non-circular portion 340A need not be provided.

Similarly, overflow outlet pipes 370 connect the overflow outlet of each of the separators 301–305 with overflow manifold assembly 330, similar to manifold 340, which extends through top adapter 310. Underflow manifold assembly 340 is preferably substantially larger in cross-sectional area than that of overflow manifold assembly 330 to accommodate the relatively larger flow rate of the underflow stream. For example, separation apparatus in accordance with the embodiment of FIGS. 4A–4E, has been successfully used with the cross-sectional area of the underflow manifold assembly 340 being up to four times larger than the cross-sectional area of the overflow manifold assembly 330. Further, those sections 340B of underflow manifold 340 extending between the underflow outlets of adjacent separators may increase in diameter from separator 301 to separator 305 since the largest volume of flow will occur through underflow manifold 340 adjacent the outlet of lowermost separator 305.

The outside diameter of housing 300 is preferably less than the inside diameter of the well casing by only the clearance necessary to run the assembly into the well, for example a diametrical clearance of one-sixteenth of an inch may be used. This maximizes the diameter of the housing 300 which, in turn, maximizes the size of hydrocyclone separators 301–305, thereby maximizing the capacity of the entire separator assembly. The well casing diameter may be measured prior to running the housing into the well, to ensure sufficient clearance is present. Alternatively, housing 300 may comprise the well casing itself, which further increases the diameter of separator assembly 313 and increases capacity.

The construction of the separator assembly described above is preferably simplified by the use of standard pipe sections and standard de-oiling hydrocyclones, as described previously. The specialty parts required may include the top adapter 310, bottom adapter 380, the non-circular portions 340A (if necessary) of underflow manifold 340, underflow pipes 360 and 360A, and overflow pipes 370. As can be seen from a comparison of FIG. 3B and FIG. 4B, adapter 211 as described with reference to FIG. 3B is not required between adjacent hydrocyclone separators in the assembly configuration of the embodiment described with reference to FIG. 4B.

In use, the installation and operation of separator assembly 313 is as described above with reference to separator assembly 113, which is illustrated in FIGS. 3A and 3B. Separator assembly 313 is capable of substantially greater capacity than assembly 113.

For example, assemblies such as assembly 313 having five standard sized hydrocyclones in accordance with the embodiment described above have been constructed and tested where the diameter of housing 300 is 5.5 inches and the length of housing 300 is about 24 feet. Such an assembly is suitable for use in 7 inch well casing. A capacity of up to 10,000 barrels of production fluid per day can be achieved with such a five hydrocyclone assembly. The ratio of the cross-sectional area of the head of hydrocyclones 301–305 to the cross-sectional area of the housing 300 is about 0.3 or greater. This ratio is smaller than 0.5 because standard-sized hydrocyclones were used. It is preferable to maximize this ratio to maximize the capacity of the separator assembly.

While it is possible to create a modular system by combining two or more separator assemblies 313 with appropriate manifold connections, this becomes increasingly difficult as the number of hydrocyclone separators increases. This is because the piping and manifolding required exceeds the space available within housing 300, particularly at the lower end of the housing 300, for a given well casing diameter, when the number of hydrocyclones exceeds a certain value.

While a preferred embodiment of the invention has been described, modifications thereof can be made by one skilled in the art without departing from the spirit of the invention.

We claim:

1. Apparatus disposed downhole in a well, comprising:

a tubular housing having a production fluid chamber which is in fluid communication with, and at least partially flooded with, production fluids produced in the well, wherein the housing has an outside diameter which is at least substantially equal to the difference between the diameter of an oil well casing and a running clearance of approximately one-eighth of an inch for insertion of the housing within the well casing;

a hydrocyclone assembly disposed within the production fluid chamber for separating the production fluids into a more dense overflow fluid stream and a less dense underflow fluid stream, said assembly having a separation chamber with a head portion in the form of an axially extending surface of revolution of substantially uniform configuration and a contiguous tail portion in the form of an axially extending surface of revolution of generally tapered configuration, said head portion being of greater diameter than said tail portion and having a tangential production fluid inlet for the flow of production fluids into the separation chamber and an overflow outlet for the flow of the overflow fluid stream from the separation chamber, said tail portion having an underflow outlet for flow of the underflow fluid stream from said separation chamber;

an overflow fluid manifold extending through said housing and connected to said overflow outlet for receiving the overflow fluid stream from said hydrocyclone assembly;

an underflow fluid manifold extending through said housing and connected to said underflow outlet for receiving the underflow fluid stream from said hydrocyclone assembly.

2. The apparatus of claim 1, wherein the housing comprises the oil well casing.

3. The apparatus of claim 1, wherein the underflow fluid manifold has, in part, a substantially kidney-shaped cross-sectional portion.

4. The apparatus of claim 1, wherein the underflow fluid manifold has a cross-sectional area for flow that is approximately four times as great as that of the overflow fluid manifold.

5. The apparatus of claim 1, further comprising:

a production fluid pump, disposed down hole, for pumping production fluids into the housing.

6. The apparatus of claim 5, further comprising:

an overflow fluid pump, disposed down hole, for pumping the overflow fluid stream above ground;

overflow fluid pump drive means for driving the overflow fluid pump.

7. The apparatus of claim 6, wherein the production fluid pump and the overflow fluid pump are electric submersible pumps.

8. The apparatus of claim 6, wherein the production fluid pump and the overflow fluid pump are progressive cavity pumps.

9. The apparatus of claim 6, wherein the production fluid pump and production fluid pump drive means, and the overflow fluid pump and overflow fluid pump drive means are disposed above the housing and downhole within the oil well casing.

10. The apparatus of claim 5, wherein the production fluid pump is an electric submersible pump.

11. The apparatus of claim 5, wherein the production fluid pump is a progressive cavity pump.

12. The apparatus of claim 1, further comprising a housing production inlet, open to the separation chamber and disposed at an end of the housing, and through which the production fluids pass to the tangential fluid inlet of the hydrocyclone assembly.

13. The apparatus of claim 1, further comprising a housing production inlet, comprising a plurality of apertures in a peripheral wall of the tubular housing.

14. The apparatus of claim 1, further comprising a housing production inlet, comprising an aperture in a peripheral wall of the tubular housing.

15. Apparatus comprising:

a tubular housing disposed downhole within an oil well casing, and which is in fluid communication with, and at least partially flooded with, production fluids;

a first hydrocyclone assembly disposed within the housing for separating a production fluid stream into a more dense overflow fluid stream and a less dense underflow fluid stream comprising: a first separation chamber having a first head portion in the form of an axially extending surface of revolution of substantially uniform configuration and a first contiguous tail portion in the form of an axially extending surface of revolution of generally tapered configuration, the first head portion being of greater diameter than the first tail portion, and having a tangential production fluid inlet for inlet of the production fluid stream into the first separation chamber, and further having a first overflow outlet for outlet of the overflow fluid stream from the first separation chamber, the first tail portion having a first underflow outlet for outlet of the underflow fluid stream from the first separation chamber;

a second hydrocyclone assembly disposed within the housing, for separating the production fluid stream into the more dense overflow fluid stream and the less dense underflow fluid stream comprising: a second separation chamber having a second head portion in the form of an axially extending surface of revolution of substantially uniform configuration and a second contiguous tail portion in the form of an axially extending surface of revolution of generally tapered configuration, the second head portion being of greater diameter than the second tail portion, and having a tangential production fluid inlet for inlet of the production fluid stream into the second separation chamber, and further having a second overflow outlet for outlet of the overflow fluid stream from the second separation chamber, the second tail portion having a second underflow outlet for outlet of the underflow fluid stream from the second separation chamber;

an overflow fluid manifold disposed substantially within the housing for receiving the overflow fluid stream from the first and second overflow fluid outlets, said overflow manifold having a substantially constant cross-sectional area; and an underflow fluid manifold disposed within the housing for receiving the underflow fluid stream from the first and second underflow outlets, said underflow manifold having a non-circular portion wherein the hydrocyclone assemblies are located in a substantially longitudinal position with respect to each other.

16. The apparatus of claim 15 wherein the cross-section of the underflow fluid manifold is, in part, substantially kidney-shaped.

17. The apparatus of claim 15 wherein the head portion of the second hydrocyclone assembly is adjacent both the first contiguous tail portion of the first hydrocyclone assembly and a kidney-shaped cross-sectional portion of the underflow fluid manifold.

18. The apparatus of claim 17 wherein the difference between the diameter of the well casing and the outside diameter of the housing is approximately equal to a clearance for running the housing into the well casing.

19. The apparatus of claim 18 wherein the clearance is approximately one-eighth of an inch.

20. The apparatus of claim 18 wherein the clearance is less than one-eighth of an inch.

21. An apparatus disposed in a borehole of a well for separating a recovery liquid from mixed liquids produced by the well, comprising:

a tubular housing forming a chamber;

a cyclone separator disposed within said chamber for separating the recovery liquid from the mixed liquids, said separator having an inlet for the mixed liquids, a first outlet for the recovery liquid, and a second outlet for disposed liquids;

a first conduit connected to said first outlet for flowing the recovery liquid from the well to the surface; and a second conduit connected to said second outlet for flowing the disposed liquids into the borehole of the well;

wherein at least one of said conduits has a non-circular portion which is longitudinally oriented relative to said separator and disposed alongside said separator between said separator and said housing.

22. The apparatus of claim 21, further including a pump disposed in the borehole and connected to said inlet for pumping the mixed liquids into said separator.

23. An apparatus disposed in a borehole of a well for separating a recovery liquid from mixed liquids produced from a formation in the well, comprising:

a tubular housing forming a cylindrical chamber, said chamber being open to the flow of the mixed liquids;

a plurality of cyclone separators disposed substantially longitudinally with respect to each other within said chamber for separating the recovery liquid from the mixed liquids, each said separator having an inlet for allowing the mixed liquids in said chamber to flow into each said separator, a first outlet for the recovery liquid, and a second outlet for disposed liquids;

a first manifold connected to each of said first outlets for flowing the recovery liquid to the surface of the well; and a second manifold connected to each said second outlet for removing the disposed liquids;

wherein at least one of said manifolds has a non-circular portion which is longitudinally oriented relative to at least one of said separators and disposed alongside at least one of said separators between said separator and said housing.

24. The apparatus of claim 23, wherein said second manifold increases in flow area in the direction of flow of the disposed liquids.

25. The apparatus of claim 24 wherein said second manifold has sized sections for each said separator with said sized sections increasing in cross-sectional area in the direction of flow of the disposed liquids.

26. The apparatus of claim 23, wherein said first manifold has a constant flow area.

27. The apparatus of claim 23, wherein each said cyclone separator has a head which has the largest cross-sectional area of said separator, said configured portion of said second manifold is disposed between said head and said housing.

28. The apparatus of claim 27, wherein said configured portion has a flow area which prevents restricted flow of the disposed liquids through said manifold between said head and said housing.

29. The apparatus of claim 27, wherein the cross-sectional area of said head is at least 30 percent of the cross-sectional area of said housing.

30. The apparatus of claim 27, wherein the cross-sectional area of said head is at least 50 percent of the cross-sectional area of said housing.

31. The apparatus of claim 23, wherein said housing includes a tubular wall having a plurality of apertures therethrough.

32. The apparatus of claim 31, wherein said apertures are located adjacent the formation.

33. An apparatus for separating production fluids downhole in a well, comprising:

a hydrocyclone assembly having at least two separators, each separator having a head portion and a tail portion, each said head portion being of greater diameter than said tail portion and having an overflow outlet, each said tail portion having an underflow outlet wherein the separators are disposed substantially longitudinally with respect to each other;

an overflow fluid manifold connected to each said overflow outlet; and an underflow fluid manifold connected to each said underflow outlet;

wherein at least one of said manifolds has a non-circular portion which is longitudinally oriented relative to at least one of the separators and disposed adjacent the head portion of at least one of said separators.

34. The apparatus of claim 33, wherein the non-circular portion of the manifold has a substantially kidney-shaped cross-section.

35. The apparatus of claim 33, wherein the hydrocyclone assembly is positioned within a tubular housing.

36. The apparatus of claim 33, wherein the hydrocyclone assembly is positioned between two packers.

37. The apparatus of claim 33, wherein the underflow fluid manifold has the non-circular portion.

38. An apparatus for separating production fluids downhole in a well, comprising:

a hydrocyclone assembly having at least two separation chambers, each separation chamber having a head portion and a tail portion, each said head portion being of greater diameter than said tail portion, each said tail portion having an underflow outlet wherein the separation chambers are disposed substantially longitudinally with respect to each other; and an underflow fluid manifold connected to each said underflow outlet, the underflow fluid manifold having a non-circular portion which is longitudinally oriented relative to at least one of said separation chambers and disposed adjacent the head portion of at least one of said separation chambers.

39. The apparatus of claim 38, wherein the non-circular portion of the underflow fluid manifold has a substantially kidney-shaped cross-section.

40. The apparatus of claim 38, wherein the hydrocyclone assembly is positioned within a tubular housing.

41. The apparatus of claim 38, wherein the hydrocyclone assembly is positioned between two packers.

42. An apparatus for separating production fluids downhole in a well, comprising:

a hydrocyclone assembly disposed between two packers for separating the production fluids into a more dense overflow fluid stream and a less dense underflow fluid stream, said assembly having at least two separation chambers and each separation chamber having a head portion and a tail portion, each said head portion being of greater diameter than each said tail portion and having a tangential production fluid inlet for the flow of production fluids into the separation chamber and an overflow outlet for the flow of the overflow fluid stream from the separation chamber, each said tail portion having an underflow outlet for flow of the underflow fluid stream from said separation chamber;

an overflow fluid manifold extending through one of said packers and connected to each said overflow outlet for receiving the overflow fluid stream from each said hydrocyclone assembly;

an underflow fluid manifold extending through one of said packers and connected to each said underflow outlet for receiving the underflow fluid stream from each said hydrocyclone assembly;

wherein at least one of said manifolds has a non-circular portion which is longitudinally oriented with respect to at least one of the separation chambers and disposed adjacent the head portion of at least one of the separation chambers and wherein the separation chambers are positioned substantially longitudinally with respect to each other.

43. The apparatus of claim 42, wherein the non-circular portion of the underflow fluid manifold has a substantially kidney-shaped cross-section.

* * * * *